(12) United States Patent
MacKarvich

(10) Patent No.: US 6,299,259 B1
(45) Date of Patent: Oct. 9, 2001

(54) REMOVABLE SPINDLE AXLE FOR TORSION AXLE ASSEMBLY

(76) Inventor: Charles J. MacKarvich, 3940 Paces Manor Dr., Atlanta, GA (US) 30339

(*) Notice: Subject to any disclaimer, the term of this patent is extended or adjusted under 35 U.S.C. 154(b) by 0 days.

(21) Appl. No.: 09/347,080
(22) Filed: Jul. 2, 1999
(51) Int. Cl.[7] .................................................. B60B 35/06
(52) U.S. Cl. ......................................... 301/127; 301/132
(58) Field of Search ................................. 301/124.1, 127, 301/131, 132; 280/124.149, 124.166, 124.167, 684

(56) References Cited

U.S. PATENT DOCUMENTS

| | | | |
|---|---|---|---|
| 157,768 | * 12/1874 | Skeen | 301/127 |
| 778,169 | * 12/1904 | Brink | 301/127 |
| 806,618 | * 12/1905 | Atwell | 301/127 |
| 955,251 | 4/1910 | Criess . | |
| 1,001,905 | * 8/1911 | Tuller | 301/127 |
| 1,028,090 | 5/1912 | Wilson . | |
| 2,501,579 | 3/1950 | Pointer | 188/206 |
| 2,638,729 | 5/1953 | Bourg | 56/249 |
| 4,004,838 | 1/1977 | Savage | 301/105 |
| 4,127,306 | 11/1978 | Foster | 301/127 |
| 4,381,874 | 5/1983 | Strader | 301/125 |
| 4,627,666 | 12/1986 | O'Neill | 301/125 |
| 4,828,328 | 5/1989 | Bowman | 301/130 |
| 4,869,556 | 9/1989 | Gees | 301/124 |
| 5,100,247 | 3/1992 | Woehler | 384/544 |
| 5,171,068 | * 12/1992 | Wu | 301/131 X |
| 5,226,691 | 7/1993 | Kane | 301/132 |
| 5,277,450 | 1/1994 | Henschen | 280/717 |
| 5,281,004 | 1/1994 | O'Leary, Jr. | 301/105 |
| 5,401,080 | 3/1995 | Wenzel | 301/132 |
| 5,533,794 | 7/1996 | Faison | 301/105.1 |
| 5,757,084 | 5/1998 | Wagner | 301/105.1 |
| 5,772,285 | 6/1998 | Bigley et al. | 301/6.8 |

FOREIGN PATENT DOCUMENTS

| 20951 | * 1/1901 | (GB) | 301/132 |
|---|---|---|---|
| 530711 | * 12/1940 | (GB) | 301/132 |

* cited by examiner

Primary Examiner—Russell D. Stormer
(74) Attorney, Agent, or Firm—Thomas, Kayden, Horstemeyer & Risley

(57) ABSTRACT

A torsion axle assembly 10 having readily removable and replaceable spindle axles 20. The assembly comprises a tubular axle beam 12, a inner torsion bar 14 seated inside the tubular axle beam 12, rubber cords 16 positioned in the four corners of the tubular axle beam 12 for providing torsional resistance to the inner torsion bar 14, torsion arms 18 rigidly secured to the inner torsion bar 14 at opposing ends thereof, and removable spindle axles 18. A removable spindle axle 20 generally includes a boss 26 of defined taper arranged and configured to be mounted in abutment with the spindle axle socket 28 of the torsion arms 18, a threaded fastener 36 for securing the spindle axle 20 to torsion arm 18, and a spindle end 30 that is arranged and configured to mount a wheel and hub assembly 32 thereon.

21 Claims, 4 Drawing Sheets

REMOVABLE SPINDLE AXLE FOR TORSION AXLE ASSEMBLY

FIELD OF THE INVENTION

The invention relates generally to a torsion axle assembly. More particularly, the invention relates to a torsion axle assembly for light weight vehicles that has readily removable, universally mountable spindle axles.

BACKGROUND OF THE INVENTION

Conventional torsion axles for the wheels of light weight vehicles such as boat trailers are known to comprise a unitary, one piece construction wherein the spindle axles are welded into the torsion arms of the torsion axle assembly. The torsion arm is in turn welded to a square inner torsion bar that is seated inside a square tubular axle beam, wherein the four corners of the square tubular axle beam accept rubber cords of a given length that provide torsional resistance to the square inner torsion bar. Often, the axle beam is welded to the vehicular frame.

A general complaint regarding the use of a torsion axle assembly has been that if a spindle axle becomes damaged due to excessive bearing wear or excessive impact, repairing the damaged spindle axle thereon requires removing the entire torsion axle. Removal of the entire torsion axle is time consuming and inordinately costly. Moreover, repair usually cannot be undertaken en route, and the vehicle must be carried to a repair facility. The present three piece torsion axle assembly with removable spindle axles is adapted to use on trailers such as are towed into and out of harsh environments, or moved under abnormal road and trail conditions such that the spindles and associated wheel bearings may suffer damage during normal use. By way of example, boat trailer axles and their spindles submerged in salt or fresh water are often worn by corrosion, dirt, etc. Likewise, utilities trailers exposed to sand and dust are subjected to a similarly harsh environment.

Accordingly, it can be understood that it would be desirable to have a means of quickly and easily repairing or replacing a damaged spindle axle or an associated bearing assembly. The disclosure of the present invention provides such means.

SUMMARY OF THE INVENTION

Disadvantages of the prior art unitary torsion axles have been overcome by the present invention which basically includes a torsion axle assembly having readily removable and replaceable spindle axles. The assembly includes a tubular axle beam which is substantially straight and substantially square in cross section, and a substantially square inner torsion bar seated inside and extending along the length of the tubular axle beam with the corners of the inner torsion bar offset from the corners of the axle beam to form longitudinal corner cavities at the corners of the axle beam. Round rubber cords are positioned in the four corner cavities of the tubular axle beam for providing torsional resistance to the rotation of the square inner torsion bar with respect to the axle beam. Torsion arms are rigidly secured at their proximal ends to the square inner torsion bar at opposing ends of the torsion bar, and spindle axles are removably mounted to the distal ends of the torsion arms. Each removable spindle axle generally includes an elongated spindle axle body having a proximal end and a distal end, a boss of defined conical taper being disposed at the proximal end of the elongated spindle axle body and arranged and configured to be mounted in abutment with the spindle axle socket of a torsion arm, which has a tapered interior surface that matches the taper of the boss. A nut connects to the threads of the proximal end of the spindle axle and functions as a releasable securing means on the proximal end of the spindle axle body for releasably securing the spindle to the spindle axle socket of the torsion arm. The distal end of the spindle is arranged and configured to rotatably mount a wheel and hub assembly thereon.

During use of the torsion axle assembly, should spindle axle or bearing failure occur, the spindle axle can be rapidly replaced without having to remove the entire torsion axle assembly from the vehicle. Replacement of the spindle axle is achieved by removing the nut or other releasable securing means from the proximal end of the damaged spindle axle, thereby allowing the operator to disengage the tapered boss of the damaged spindle axle from the corresponding tapered spindle axle socket of the torsion arm. In the preferred embodiment of the present invention, the releasable securing means comprises a single threaded fastener, a matching threaded stem, and a cotter key. Other types of releasable securing means can be used if desired. The operator then places the tapered boss of a replacement spindle axle in abutment with the corresponding spindle axle socket of the torsion arm and engages the securing means on the proximal end of the spindle axle body to draw the tapered boss into firm, non-rotational contact with the tapered spindle axle socket of the torsion arm. Ease of removal and insertion of the boss of the spindle axle is ensured by proper selection of the taper of the boss and the socket. In the preferred embodiment, the boss and socket have substantially matching conical tapers of between 5° and 15°. Also, the replacement spindle axle may be universally mounted in either torsion arm owing to the tapered boss design.

DETAILED DESCRIPTION

Figure 1:
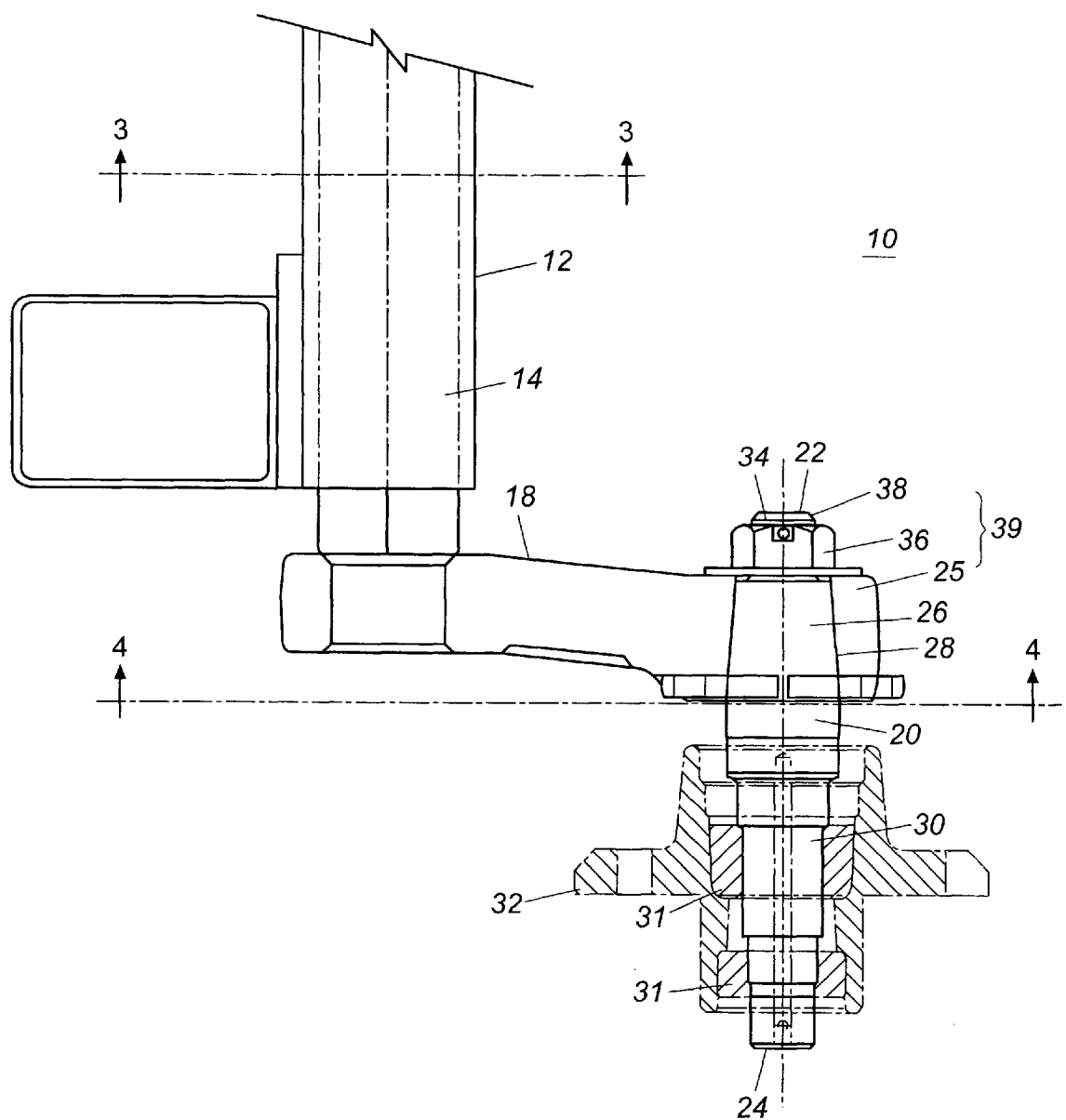
FIG. 1 is a plan view of the torsion axle assembly showing one end of the axle beam and inner torsion bar and the torsion arm assembly mounted thereto, and the spindle axle assembly with mounted wheel hub.
Figure 2:
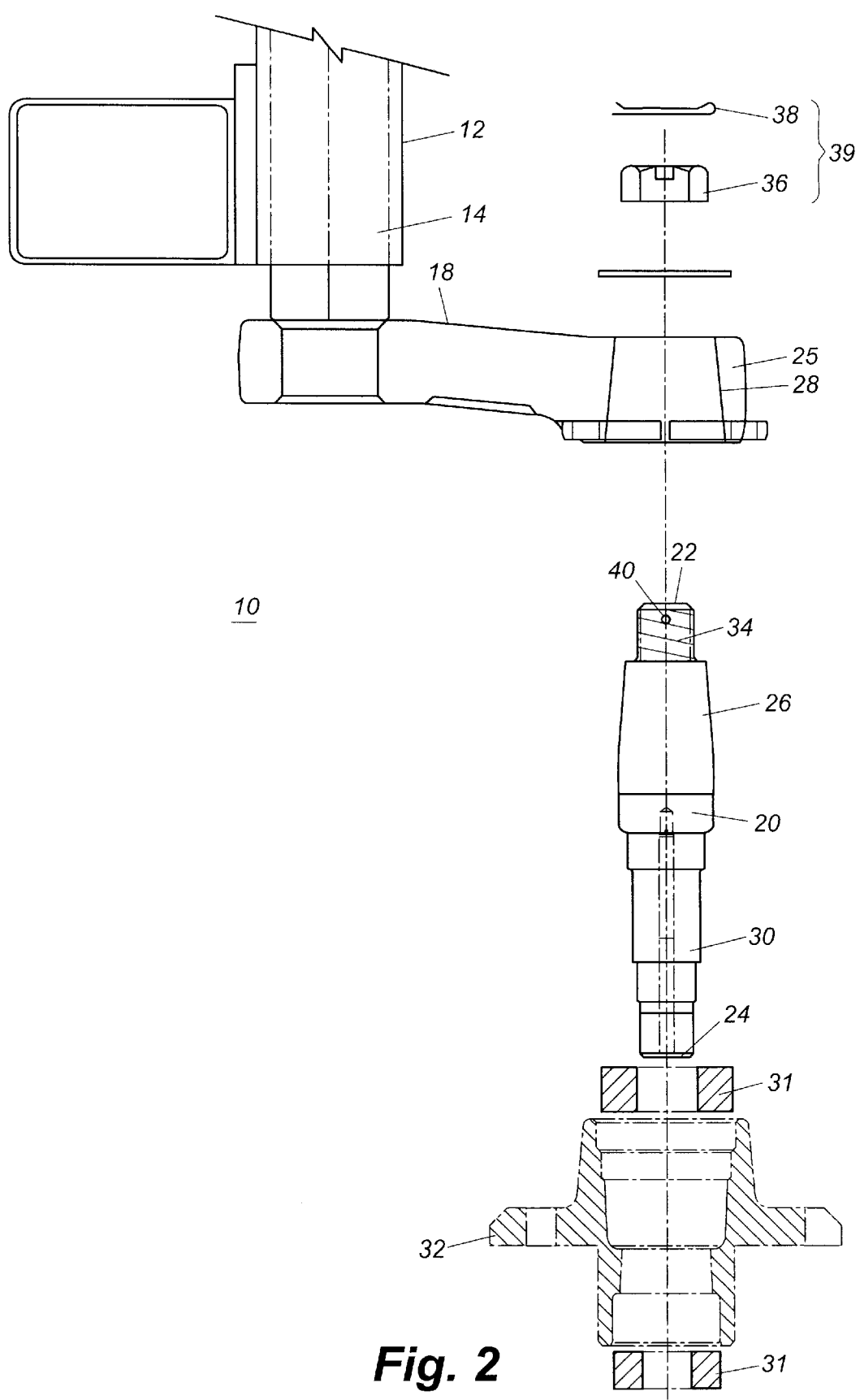
FIG. 2 is an exploded plan view of the portion of the three part torsion axle assembly shown in FIG. 1.

Referring now in more detail to the drawings, in which like numerals indicate like parts throughout the several views, FIGS. 1 and 2 illustrate a lefthand portion of a torsion axle assembly 10. The torsion axle assembly includes a substantially straight, substantially square tubular axle beam 12 and a substantially square inner torsion bar 14 seated inside the substantially square tubular axle beam 12 and oriented at a 45° angle of rotation with respect to the tubular axle beam 12. Rubber cords 16 (shown in FIG. 3) which are substantially round in cross section when not compressed are positioned in the four corners of the tubular axle beam 12 and each cord bears against the facing flat side of the inner torsion bar 14 for providing rotational or torsional resistance to the substantially square inner torsion bar 14.

Rectilinear torsion arms 18 are rigidly secured to the inner torsion bar 14 at opposing ends thereof and a tapered socket 28 is formed in the distal end 25 of each torsion arm 18. Removable spindle axles 20 are non-rotatably mounted to the distal ends of the torsion arms 18. Each removable spindle axle 20 generally comprises an elongated body having a proximal end 22 and a distal end 24, a boss 26 of defined taper being disposed at the proximal end 22 of the spindle axle 20. The boss 26 is arranged and configured to be mounted in abutment with the conically tapered spindle axle socket 28 of the torsion arm 18. A releasable securing means 39 on the proximal end 22 of the spindle axle 20 secures the boss 26 in the spindle axle socket 28 of the torsion arm 18. A spindle end 30 is arranged and configured to accept bearing means 31, thereby allowing a wheel (not shown) and hub assembly 32 to be rotatably mounted thereon.

As depicted in FIGS. 1 and 2, in the preferred embodiment of the present invention, the boss 26 comprises an external converging taper that is substantially conical and the taper of the boss 26 is between 5° and 15°. The socket 28 of each torsion arm 18 is also conically tapered and the angle of its taper matches the angle of taper of the boss 26. When the taper of the boss 26 and socket 28 is less than 5°, it is difficult to remove the boss 26 from the spindle axle socket 28. When the taper of the boss 26 is greater than 15°, the boss 26 is more likely to rotate in the spindle axle socket 28. A preferred embodiment of the present invention has a boss 26 an spindle axle socket 28 taper of between 9° and 11°. Also, the releasable securing means 39 of the preferred embodiment of the present invention as depicted in FIGS. 1 and 2 comprises a threaded stem 34 on the proximal end 22 of the spindle axle 20 and an interlocking threaded fastener 36. The interlocking threaded fastener 36 is further secured on the threaded stem 34 by a cotter key 38 inserted in an orifice 40 passing through the threaded stem 34 of the spindle axle 20. Other types of conventional nuts, clamps, threaded or non threaded fastners can be used for this purpose.

Figure 3:
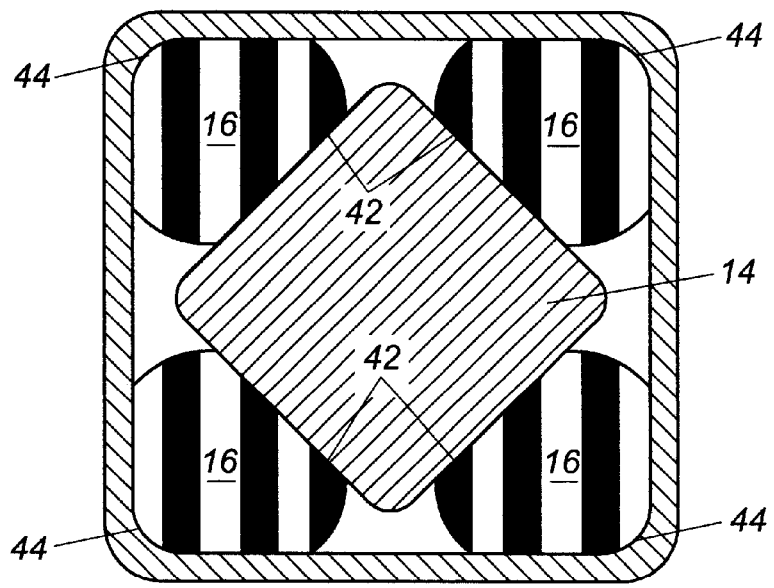
FIG. 3 is a cross sectional view of the tubular axle beam shown in FIGS. 1 and 2 along the line 3—3 of FIG. 1.

FIG. 3 shows a cross sectional view of the torsion axle assembly 10 shown in FIGS. 1 and 2 along the line 3—3 of FIG. 1. A substantially square inner torsion bar 14 extends along the length of the substantially square tubular axle beam 12 with the corners of the inner torsion bar 14 rotatably offset from the corners of the tubular axle beam 12 to form longitudinal triangular corner cavities at the corners of the tubular axle beam 12. Rubber cords 16 are positioned in the four corner cavities formed by the flat outer surfaces 42 of the substantially square inner torsion bar 14 which face the opposing corners 44 of the substantially square tubular axle beam 12. The rubber cords 16 extend along the length of the substantially square tubular axle beam 12 and provide torsional resistance to rotation of the substantially square inner torsion bar 14 relative to the substantially square tubular axle beam 12.

Figure 4:
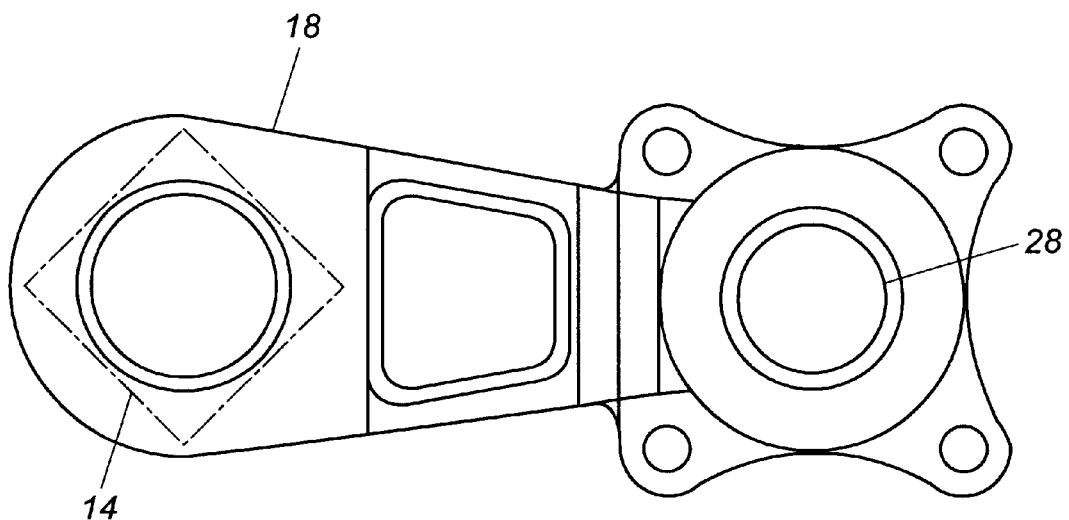
FIG. 4 is a side perspective view of the torsion arm shown in FIGS. 1 and 2 along the line 4—4 of FIG. 1.

FIG. 4 shows the torsion arm 18 shown in FIGS. 1 and 2 along the line 4—4 of FIG. 1. In this view, the tapered spindle axle socket 28 is visible. The torsion arm 18 is rigidly secured to the end of the substantially square inner torsion bar 14.

Figure 5:
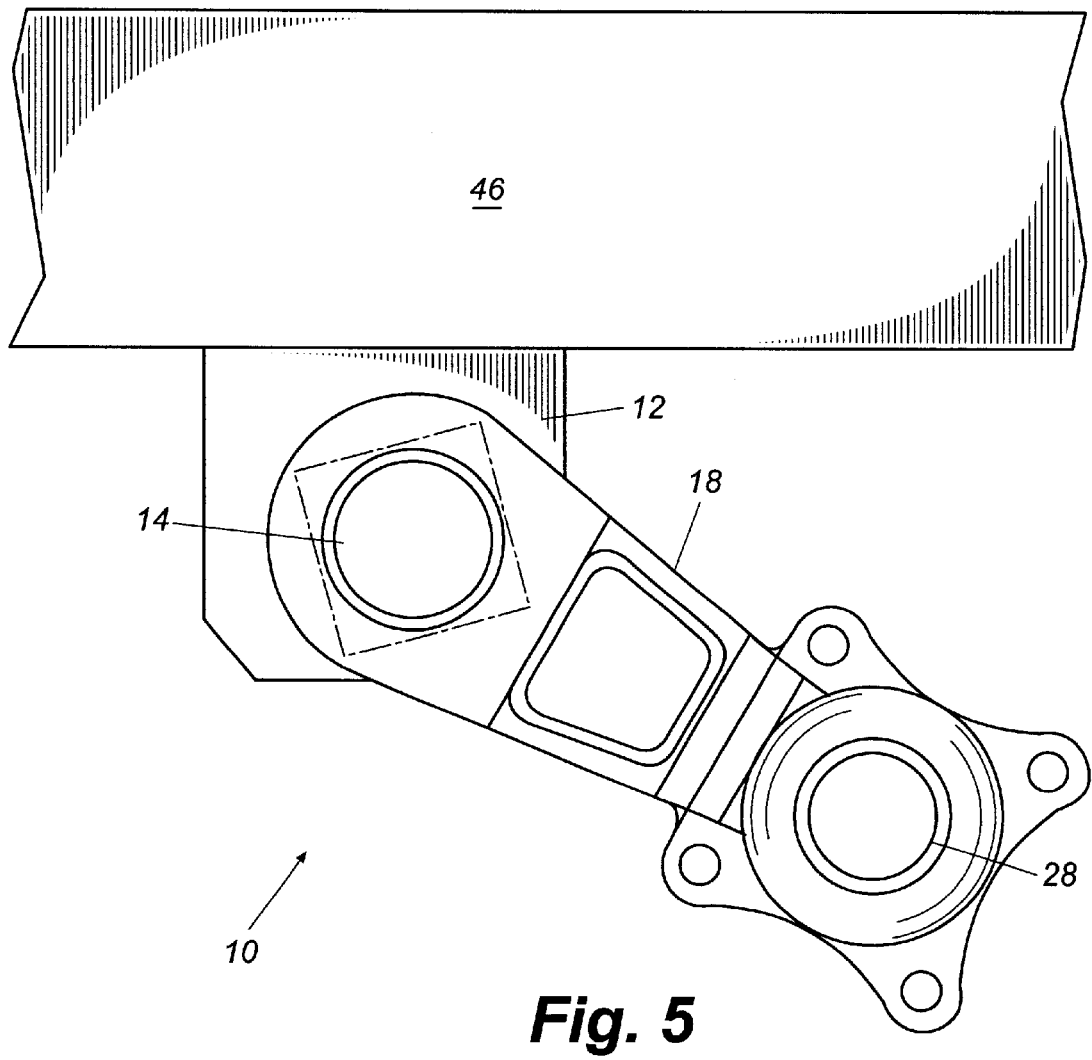
FIG. 5 is a side view of the torsion axle assembly shown in FIG. 1 as attached to a vehicular frame during routine operation. The spindle assembly is not included in this view.

FIG. 5 shows the lefthand portion of the torsion axle assembly 10 depicted in FIG. 1 and 2 as attached to a vehicular frame 46 during normal operation. The substantially square tubular axle beam 12 can be secured to the vehicular frame 46 by welding. The square inner torsion bar 14 and the rubber cords 16 (shown in FIG. 3) pass through the square tubular axle beam 12. The rectilinear torsion arm 18 is rigidly secured to the inner torsion bar 14 at its opposing ends. The spindle axle 20 and hub assembly 32 shown in FIGS. 1 and 2 are not shown here.

During routine usage of a vehicular torsion axle 10, it is often necessary to replace a spindle axle 20 due to routine wear, damage from excessive shock, or bearing failure. A method for replacing the spindle axle 20 on a torsion axle assembly 10 such that the repair may be accomplished without having to remove the entire torsion axle assembly 10 from the vehicle will now be described. Replacement of the spindle axle 20 is achieved by removing the releasable securing means 39 from the proximal end 22 of the spindle axle 20. In the preferred embodiment of the present invention, as depicted in FIGS. 1 an 2, removing the releasable securing means 39 requires removing a cotter key 38 from a hole 40 in the threaded stem 34 of the spindle axle 20 as well as removal of a single threaded fastener 36 from a threaded stem 34. The boss 26 of the spindle axle 20 can now be axially disengaged from the corresponding spindle axle socket 28 of the torsion arm 18. The boss 26 of the replacement spindle axle 20 can then be placed in abutment with the corresponding spindle axle socket 28 of the torsion arm 18. The threaded fastener 36 is tightened onto the threaded stem 34 to draw and secure the tapered boss 26 of the spindle axle 20 in the tapered spindle axle socket 28 of the torsion arm 18. Ease of removal and insertion of the boss 26 is ensured by proper selection of the defined taper of the boss 26. In a preferred embodiment, the boss 26 and socket 28 are formed with male and female conical tapers of between 9° and 11°. Also, the replacement spindle axle 20 may be universally mounted in either torsion arm 18 owing to the tapered boss 26.

While preferred embodiments of the invention have been disclosed in detail in the foregoing description and drawings, it will be understood by those skilled in the art that variations and modifications thereof can be made without departing from the spirit and scope of the invention as set forth in the following claims.

What is claimed is:

1. A removable spindle axle for a torsion axle assembly of a light weight vehicle comprising;

a torsion arm defining a tapered open-ended spindle axle socket, an elongated spindle axle body having a proximal end and a distal end, said proximal end including a tapered boss for mounting in said spindle axle socket of said torsion arm such that said proximal end extends through the spindle axle socket, said tapered open-ended spindle axle socket and said boss each being formed with converging substantially conical complementary tapers of between 5° and 15° converging toward said proximal end of said spindle axle body, releasable securing means on said proximal end of said spindle axle body for securing said spindle axle to said complementary tapered socket, and a spindle end disposed toward said distal end adapted for mounting a wheel and hub assembly thereon.

2. The removable spindle axle of claim 1, wherein said conical taper is between 9° and 11°.

3. A removable spindle axle for a torsion axle assembly of a light weight vehicle, comprising:

an elongated spindle axle body having a proximal end and a distal end;

a boss being disposed toward said proximal end of said spindle axle body, wherein said boss is arranged and configured to be received by a spindle axle socket of a torsion axle assembly, wherein said boss comprises an externally converging defined taper extending toward said proximal end;

releasable securing means for securing said spindle axle to a substantially corresponding spindle axle socket of the torsion axle assembly, wherein said releasable securing means are on said proximal end of said spindle axle body; and a spindle end extending toward said distal end, wherein said spindle end is arranged and configured to rotatably mount a wheel and hub assembly thereon.

4. The removable spindle axle of claim 3, wherein the external converging taper of said boss is substantially conical.

5. The removable spindle axle of claim 3, wherein the external converging taper of said boss is between 5° and 15°.

6. The removable spindle axle of claim 4, wherein the external converging taper of said boss is between 5° and 15°.

7. The removable spindle axle of claim 3, wherein said releasable securing means comprises a threaded stem and interlocking threaded fastener.

8. The removable spindle axle of claim 7, wherein said interlocking threaded fastener is further secured on said threaded stem by a cotter key inserted in an orifice, wherein said orifice is between said proximal end of said spindle axle body and an end of said interlocking threaded fastener being disposed toward said proximal end of said spindle axle body, wherein said orifice passes through said threaded stem and is substantially perpendicular to a longitudinal axis of said spindle axle.

9. A method for replacing a spindle axle of a torsion axle assembly for a light weight vehicle, comprising the steps of:

providing an elongated spindle axle body having a proximal end and a distal end;

providing a boss being disposed toward said proximal end of said spindle axle body, wherein said boss is arranged and configured to be received by a spindle axle socket of a torsion axle assembly, wherein said boss comprises an externally converging defined taper extending toward said proximal end;

providing releasable securing means for securing said spindle axle to a substantially corresponding spindle axle socket of the torsion axle assembly, wherein said releasable securing means are on said proximal end of said spindle axle body;

providing a spindle end extending toward said distal end, wherein said spindle end is arranged and configured to rotatably mount a wheel and hub assembly thereon;

removing said releasable securing means from said proximal end of spindle axle body; and disengaging said boss from said spindle axle socket of said torsion axle assembly.

10. The method of claim 9, further comprising the steps of:

providing a replacement spindle axle;

mating said boss of said replacement spindle axle and said spindle axle socket of the torsion axle assembly; and engaging releasable securing means on said proximal end of said spindle axle body.

11. The method of claim 10, wherein the step of engaging said releasable securing means is accomplished by threading a single fastener onto a threaded stem.

12. The method of claim 11, wherein the step of engaging said releasable securing means further comprises insertion of a cotter key into an orifice in said threaded stem, wherein said orifice is substantially perpendicular to the longitudinal axis of the portion of said threaded stem that is between said proximal end of said spindle axle body and a surface of said threaded fastener being disposed toward said proximal end of said spindle axle.

13. The method of claim 10, further comprising a step of securing the torsion axle assembly to a frame of the vehicle.

14. The method of claim 10, further comprising a step of rotatably mounting the wheel and hub assembly on said spindle axle.

15. The method of claim 9, wherein the step of providing a boss of defined taper is accomplished by providing a substantially conical boss with an external converging taper of between 5° and 15°.

16. The method of claim 9, wherein the step of removing said releasable securing means from said proximal end of said spindle axle body is accomplished by disengaging a single threaded fastener from a threaded stem.

17. The method of claim 16, wherein the step of removing said releasable securing means further comprises removal of a cotter key from an orifice in said threaded stem, wherein said orifice is substantially perpendicular to the longitudinal axis of the portion of said threaded stem that is between said proximal end of said spindle axle body and a surface of said threaded fastener being disposed toward said proximal end of said spindle axle.

18. A torsion axle assembly for a light weight vehicle, comprising:

a substantially straight, substantially square tubular axle beam adapted for attachment to a frame of a vehicle;

a substantially square inner torsion bar seated inside said substantially square tubular axle beam;

rubber cords positioned in the corners of said tubular axle beam and bearing against the flat sides of said inner torsion bar, wherein said rubber cords provide torsional resistance to the rotation of said inner torsion bar with respect to said axle beam;

rectilinear torsion arms having proximal and distal end portions, said torsion arms rigidly secured at their proximal end portions to said square inner torsion bar at opposing ends thereof and defining conical spindle axle sockets at their distal end portions; and elongated spindle axles, each comprising a proximal end and a distal end, said proximal end including a conical boss for mounting in said conical spindle axle sockets of said torsion arms such that said proximal end extends through said spindle axle socket, said boss and said socket each being formed with converging substantially conical tapers of between 5° and 15°, means on said proximal end for releasably securing said spindle axle to said spindle axle socket of said torsion arm, and a spindle end arranged and configured to mount a wheel and hub assembly thereon.

19. The torsion axle assembly of claim 18, wherein said torsion axle assembly is secured to a frame of the vehicle.

20. The torsion axle assembly of claim 18, further comprising a wheel and hub assembly rotatably mounted on said spindle axle.

21. A removable spindle axle assembly for mounting to a torsion bar of a torsion axle of a light weight vehicle, comprising:

a torsion arm having a first end and a second end, said first end of said torsion arm constructed and arranged for rigid attachment to a torsion bar of a torsion axle assembly, said second end of said torsion arm defining an open ended tapered socket having a conically shaped interior wall;

said conically shaped interior wall of said socket of said torsion arm being tapered between 5 degrees and 15 degrees;

an elongated spindle axle having a body with a proximal end and a distal end;

a tapered boss formed on said spindle axle at said proximal end, said boss having a conically shaped exterior wall of the same conical shape as said tapered socket of said torsion arm and telescopically received in frictional fit by said socket of said torsion arm with said distal end of said spindle axle extending out of said socket of said torsion arm;

releasable securing means mounted on said proximal end of said spindle axle and securing said spindle axle in frictional fit with said torsion arm;

a bearing mounted about said spindle axle intermediate said proximal and distal ends of said spindle axle;

a hub mounted on said bearing and extending about said spindle axle for supporting a wheel on said spindle axle;

whereby said spindle axle, a hub and wheel mounted on said spindle axle can be removed as a unit from said torsion arm by releasing said releasable securing means from said spindle axle and withdrawing said spindle axle from said torsion arm.

* * * * *